United States Patent [19]

Hobbs

[11] Patent Number: 4,659,236

[45] Date of Patent: Apr. 21, 1987

[54] FLUSH MOUNTED TEMPERATURE SENSOR

[75] Inventor: Michael L. Hobbs, Parkville, Mo.

[73] Assignee: Tempmaster Corporation, North Kansas City, Mo.

[21] Appl. No.: 789,661

[22] Filed: Oct. 21, 1985

[51] Int. Cl.$^4$ .......................... G01K 1/14; G01K 1/16
[52] U.S. Cl. ........................... 374/208; 236/DIG. 12; 236/94; 307/310; 374/100; 374/173; 374/170
[58] Field of Search ............... 374/39, 100, 101, 120, 374/134, 149, 163, 208, 209, 142, 109, 210, 173, 178, 172, 170; 339/123; 307/310, 296 R; 236/DIG. 12, DIG. 19, 94

[56] References Cited

U.S. PATENT DOCUMENTS

| | | | |
|---|---|---|---|
| 2,273,375 | 2/1942 | Ray | 236/DIG. 12 |
| 3,232,112 | 2/1966 | Wehlau | 236/DIG. 19 |
| 3,320,601 | 5/1967 | Yankus | 340/693 |
| 3,857,285 | 12/1974 | Athey et al. | 374/208 |
| 3,878,724 | 4/1975 | Allen | 374/134 |
| 4,004,462 | 1/1977 | Dobkin | 374/173 |
| 4,114,446 | 9/1978 | Walsh | 374/173 |
| 4,123,698 | 10/1978 | Timko et al. | 307/299 B |
| 4,133,208 | 1/1979 | Parlanti | 374/178 |
| 4,282,591 | 8/1981 | Andreuccetti | 174/66 |
| 4,480,312 | 10/1984 | Wingate | 374/170 |

FOREIGN PATENT DOCUMENTS

| | | | |
|---|---|---|---|
| 0077722 | 4/1983 | European Pat. Off. | 374/109 |
| 2544126 | 10/1984 | France | 374/100 |
| 0100329 | 8/1981 | Japan | 374/100 |
| 0157826 | 12/1981 | Japan | 374/172 |

Primary Examiner—Charles Frankfort
Assistant Examiner—Thomas B. Will
Attorney, Agent, or Firm—Kokjer, Kircher, Bradley, Wharton, Bowman & Johnson

[57] ABSTRACT

A temperature sensor which is flush mounted on a wall of a room in which the temperature is sensed. A mounting plate secured to the wall has a cavity in its face which receives an aluminum sensor plate and an insulating block which thermally insulates the sensor plate from the mounting plate. A temperature sensing integrated circuit contacts the back side of the sensor plate and has electrical leads which extend to the back side of a printed circuit board mounted in a pocket on the back side of the mounting plate. The integrated circuit acts as a current source having its output signal enhanced by active solid state circuit components mounted on the back side of the circuit board where their heat is dissipated by conduction through the mounting plate and wall and by convection and radiation into the wall cavity to avoid affecting the sensor plate. The circuitry allows active factory calibration and eliminates adverse effects on the signal caused by background environmental noise.

17 Claims, 5 Drawing Figures

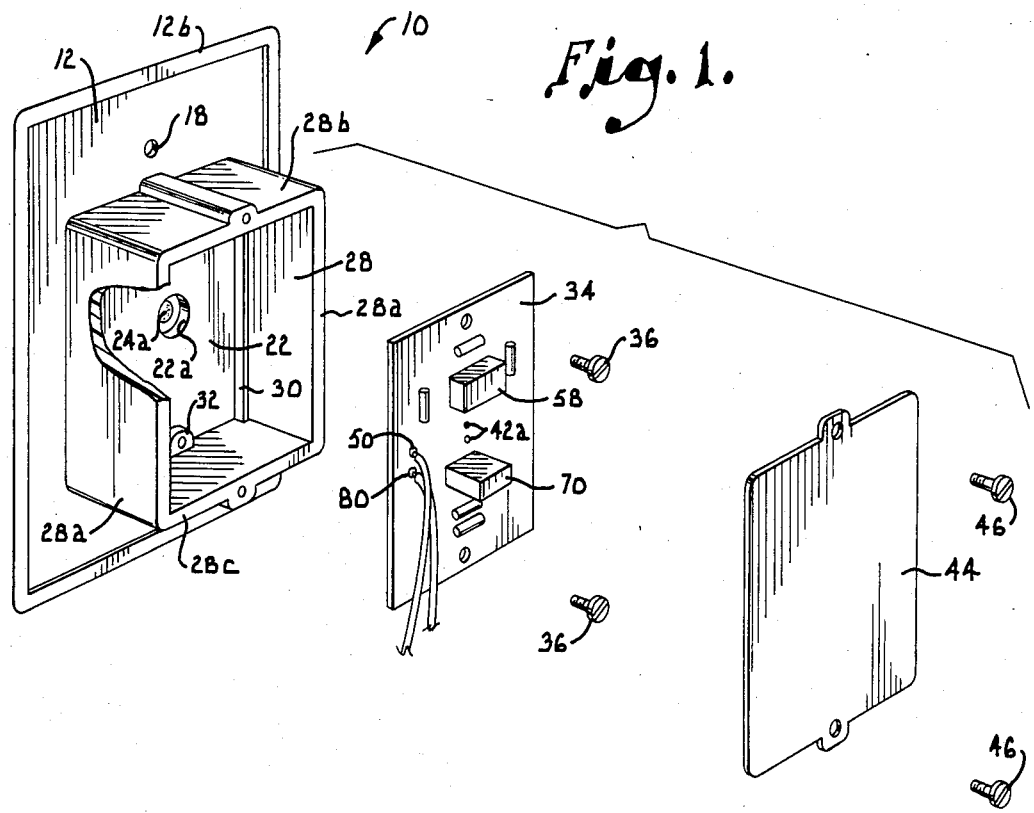
Fig. 1.
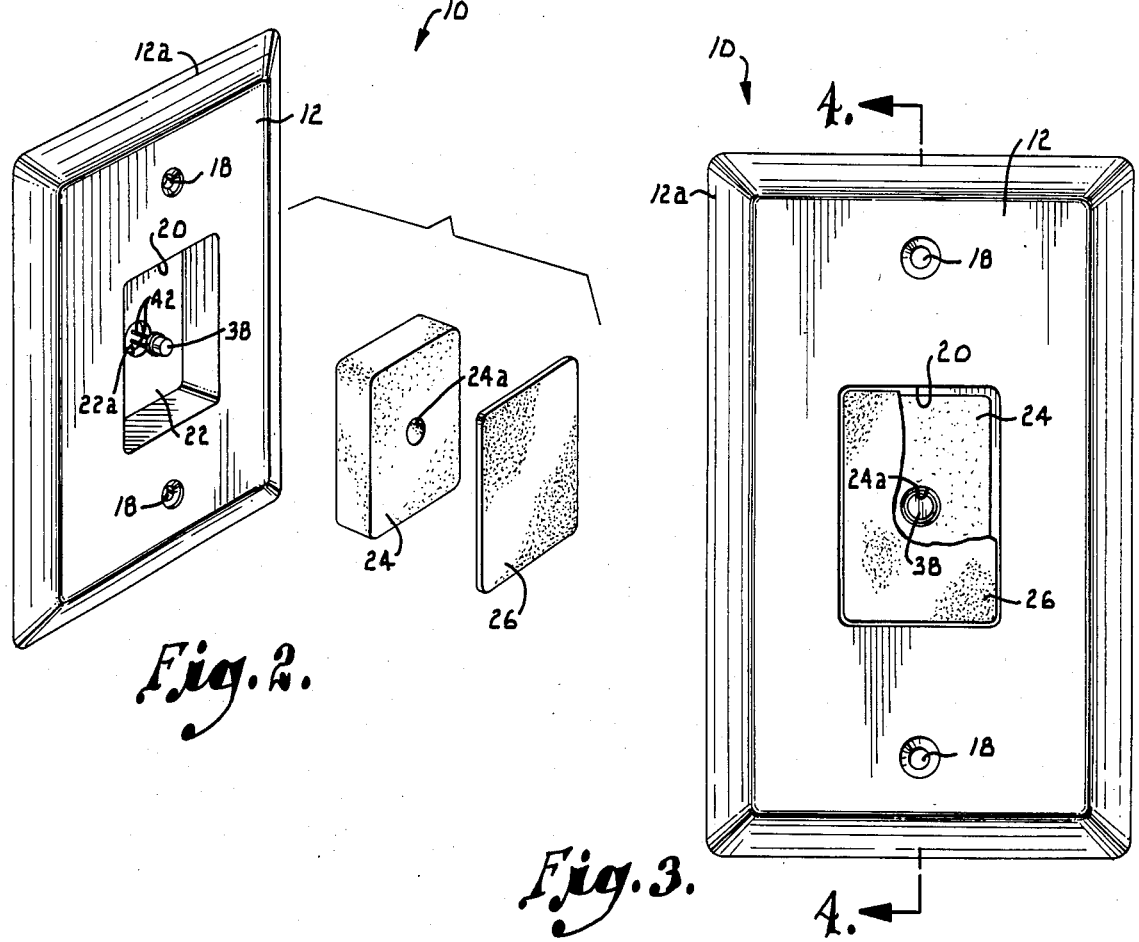
Fig. 2.
Fig. 3.

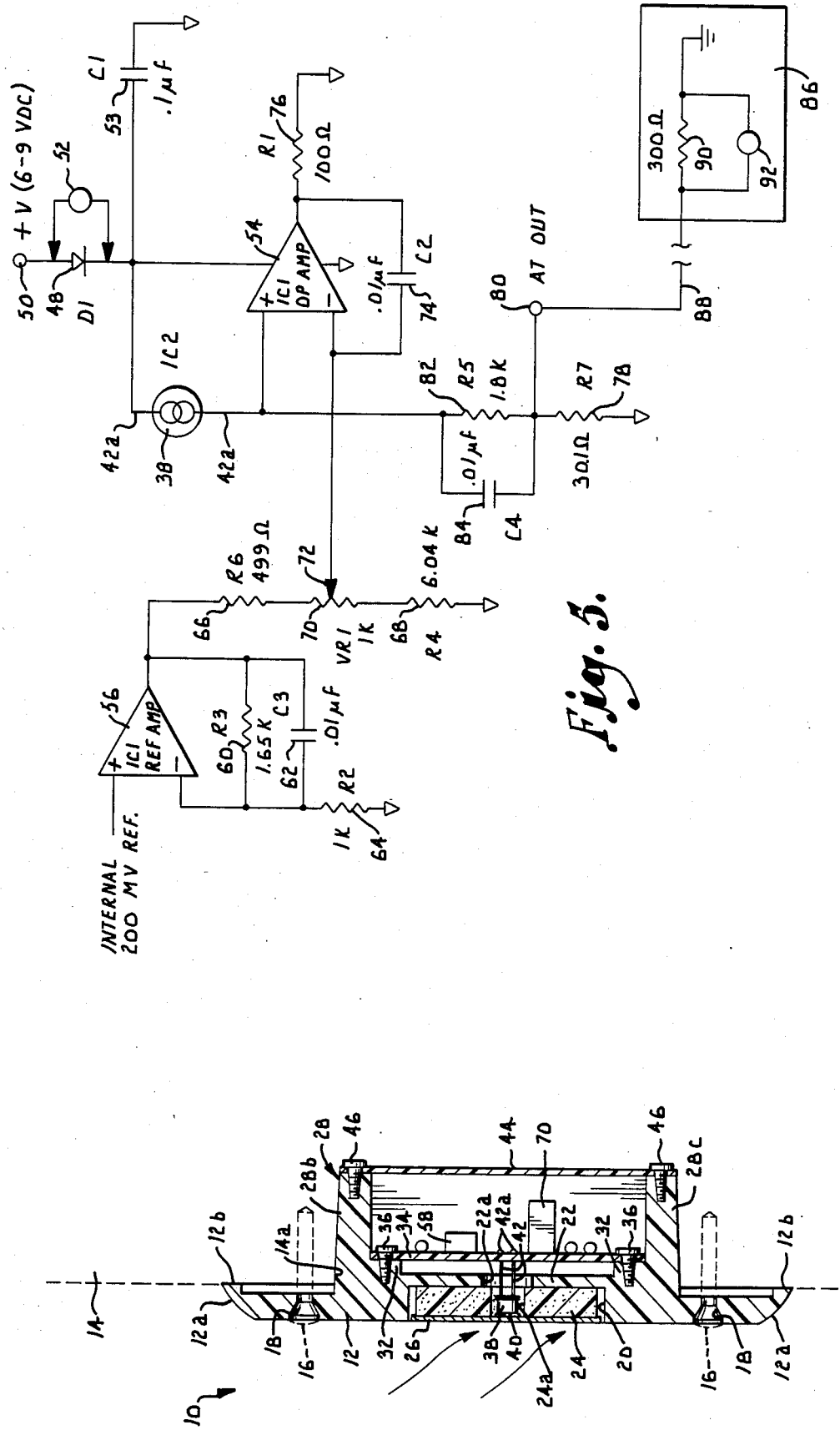

FLUSH MOUNTED TEMPERATURE SENSOR

BACKGROUND OF THE INVENTION

This invention relates generally to the sensing of temperatures in occupied spaces and deals more particularly with an electronic temperature sensor which is constructed and arranged to be mounted on a wall substantially flush with the wall surface.

In office buildings and other occupied spaces which are serviced by heating, ventilating and air conditioning (HVAC) systems, the HVAC equipment is normally controlled by a temperature sensor or thermostat in order to maintain the temperature in the occupied space at the desired level. Typically, the temperature sensor is contained in an enclosure which protrudes into the room from one of its walls. It is also common for the sensor to be mounted in a return air opening or duct where there is a positive flow of air from the conditioned space around the temperature sensing element. In either case, accuracy in the sensing of the temperature requires that the air in the room have good thermal contact with the temperature sensing element. Also, the element itself should have the minimum possible thermal capacity compared to its thermal conductivity to the room air so that it can respond quickly to temperature changes.

In the case of wall mounted sensors or thermostats, the active component is normally hidden behind a cosmetic cover which is provided with openings so that room air can migrate behind the cover and come into contact with the sensing element. Accuracy requires that the element have maximum thermal contact with the air in the conditioned space and minimum thermal contact with the wall which may have a temperature considerably different from that of the room air. Therefore, it is standard practice to mount the thermostat unit directly on the wall surface rather than recessing it or mounting it flush with the wall. Even though units which protrude into the room are recognized as being architecturally and aesthetically undesirable, they have largely been viewed as a necessary evil which must be tolerated in order to achieve both good thermal contact with the air and minimal thermal contact with the wall.

In mechanical or electrical sensing devices, the room air is allowed to directly contact a bimetal strip which provides the switching action for the HVAC equipment. The bimetal strip is thermally isolated from the remainder of the structure to the extent possible in order to prevent the wall temperature from effecting the temperature measurement. In electronic temperature sensors, the room air contacts a low power temperature sensitive element such as a thermocouple or a temperature sensitive resistor. The voltage or resistance of the element is measured from a remote location where more sophisticated active circuitry is provided.

The need to physically separate the active electronic circuitry from the sensing element creates calibration problems when the sensing element is initially installed or replaced. The element and wiring must be matched to the active circuitry which measures the output signal from the element. Although precalibrated sensing elements are available, they are relatively expensive and must be field calibrated in order to take into account the unknown resistance in the wiring which leads from the sensing element to the active circuitry. Field calibration adds significantly to the time and labor necessary to install the device and increases the cost accordingly.

Another problem is that possible electromagnetic noise in the environment creates an additional uncertainty, particularly when the signal level is relatively low.

In recent years, small integrated circuits have been developed for use as low power, temperature sensitive current sources, as exemplified by the device shown in U.S. Pat. No. 4,123,698. The patented device is precalibrated on an absolute temperature scale (1 micro amp/°K., for example). Because the device acts as a current source, its output can be measured at a remote location without being distorted by the resistance of the wiring which transmits the signal to the remote location. However, the signal level is so low that electromagnetic interference is a significant problem that can adversely effect the accuracy of the temperature measurement. Also, circuits of this type have a wide span in their intrinsic temperature range, and this makes their accuracy unacceptable in the relatively narrow temperature range of human comfort (22°-26° C.).

These problems have been recognized, and circuits have been proposed for converting the low power level and wide temperature range to a higher power (such as 4-20 milliamps) and a narrower temperature range (such as 17°-30° C.). Although these circuits have rather high power requirements in comparison to the low power sensing devices, they can be used successfully in applications where there is good thermal contact with the medium which is being sensed, such as when the sensor is embedded in solid machinery or is immersed in liquid.

Similar circuits have been proposed for use in the sensing of air temperatures in occupied spaces, but the results have not been entirely satisfactory. When the sensor can be conveniently mounted in a moving air stream such as in a return air duct, the heat generating components are not particularly objectionable because the air stream acts to dissipate the heat. However, attempts to mount the temperature sensor and the heat generating active components in a wall mounted enclosure have not met with success. In order to obtain the necessary cooling from the convection of room air, it is necessary for the enclosure to protrude out well into the room, and this is undesirable from an architectural and aesthetic standpoint. Even then, satisfactory operation requires minimum convection which is not always present and ma fluctuate in any event. Due to the presence of the heat generating components, there is a noticeable offset (typically on the order of 1° C.), between the actual room temperature and the measured temperature. In order to account for this offset, the device is usually calibrated low intentionally. However, if the actual convection is different from the convection that is expected when the device is calibrated, the temperature signal is inaccurate.

At times, convection of air in the vicinity of the temperature sensor can be completely or nearly completely stopped. Then, the temperature can build up in the dead air space in the device, and the cosmetic cover prevents air space from being dissipated by radiation. In this situation, errors as large as several degrees centigrade can result, and temperature errors of this magnitude are unacceptable. In the HVAC industry, electronic temperature sensors are expected to perform more accurately than conventional sensors rather than being lower than average in accuracy as occurs with the electronic sensors that are currently available.

Two different approaches have been followed in attempting to improve the accuracy of electronic temperature sensors. First, convection has been promoted by enlarging the package which contains the sensor and mounting it such that it protrudes out well into the room. The aesthetic disadvantages of this type of arrangement make it unacceptable in most applications even if the accuracy is within acceptable limits. The other approach that has been used involves removing the active heat generating components from the vicinity of the temperature sensing element. This approach has its own disadvantages, most notably in the inconvenience, high cost and accuracy degradation associated with the need for field calibration to compensate for the resistance in the wiring.

Using the wall as a heat sink to receive the heat generated by the electronic components has been rejected because the wall temperature often differs appreciably from the air temperature which dominates human perception. If the device is embedded in the wall to remove the heat that is generated, the wall temperature significantly affects the sensing element and results in significant steady state temperature errors caused by the difference between the wall temperature and the air temperature in the occupied space. Even more importantly, thermal delays arise and the HVAC control system can be completely destabilized in its temperature response capabilities.

SUMMARY OF THE INVENTION

Because of the foregoing thermal problems, temperature sensors used in HVAC control systems have not been mounted flush on the wall in any form (pneumatic, electric or electronic), despite the recognized architectural desirability of flush mounted sensors. Therefore, it is evident that a need exists for a temperature sensor which can be flush mounted on a wall without being subject to inaccuracy or other problems resulting from thermal effects. It is the primary goal of the present invention to meet that need. More specifically, it is among the important objects of the invention to provide a flush mounted electronic temperature sensor for HVAC application which operates accurately and is subject to only minimal self heating from the active circuit components so that it can be calibrated in the factory and interchanged in the field without being significantly affected by the resistance of the field wiring or reasonable levels of electromagnetic noise.

In accordance with the invention, a low power electronic temperature sensor which acts as a current source is packaged together with but thermally isolated from active heat generating circuit components which enhance the output signal from the sensor and make it useful in an HVAC control system. The unique electronic circuit includes an operational amplifier to provide a stable reference voltage. The temperature sensor is connected with the positive input of another operational amplifier, and the reference voltage is adjusted for calibration purposes by a potentiometer and applied to the negative input of the second operational amplifier. The amplifier output connects with its positive input through a current divider formed by three series resistors. The output from the circuit is obtained at the junction between two of the series resistors and has a gain established by the ratio of the resistances. The current gain is selected to convert the one microamp/°C. calibration of the low power sensor to about 33 microamps/°F. at the output terminal. The output zero point is also shifted from absolute zero to zero°F. which is more meaningful in connection with human comfort levels.

The current gain makes the circuit relatively insensitive to noise because it provides at the remote panel a relatively high voltage (typically, 0.75 volt). At the same time, a nearly optimal terminal resistance of 300 ohms can be used to obtain a temperature measurement which is 100 times the voltage that appears across the terminal resistance. The sensing device acts as a current source so that the resistance of the wiring has no effect on the signal. Consequently, calibration can be carried out at the factory, and the device is easier and less expensive to install and replace than devices which require calibration in the field.

The temperature sensor is thermally isolated from the heat generating electronic components and from the wall of the building by a unique physical arrangement of the parts. A flat mounting plate which can be mounted flush on a wall has a recess in its outer surface which receives a flat aluminum sensor plate. The sensor plate is exposed to the air in the room and is mounted to a styrofoam insulating block which keeps the sensor plate thermally isolated from the mounting plate and wall. Except for the temperature sensor, all of the circuit components are mounted on the back side of a printed circuit board which is recessed within a pocket on the back side of the mounting plate. The temperature sensor is glued to the back side of the aluminum plate in order to accurately sense the air temperature in the room, and the lead wires of the sensor connect with the rest of the circuitry on the back side of the circuit board.

This arrangement maintains the aluminum plate and temperature sensor in thermal isolation from the mounting plate and wall and from the heat generating components of the circuitry. At the same time, the sensor plate is exposed to the room air and the sensor is in infinite thermal contact with the sensor plate for accurate sensing of the air temperature. The contact of the mounting plate with the wall assists in conducting heat from the circuit board to the wall. The heat is also dissipated into the wall cavity by radiation and convection. The circuit board and the walls of its mounting cavity effectively shield the sensor and sensor plate from the active components on the back side of the circuit board to prevent the heat which is generated by the active components of the circuit from having a significant thermal effect on the sensor operation.

DESCRIPTION OF THE DRAWINGS

In the accompanying drawings which form a part of the specification and are to be read in conjunction therewith and in which like reference numerals are used to indicate like parts in the various views:

FIG. 1 is an exploded perspective view taken from the back of a temperature sensor constructed according to a preferred embodiment of the present invention;

FIG. 2 is an exploded perspective view taken from the front of the temperature sensor;

FIG. 3 is a front elevational view of the temperature sensor on an enlarged scale, with a portion of the sensor plate broken away for purposes of illustration;

FIG. 4 is a fragmentary sectional view taken generally along line 4—4 of FIG. 3 in the direction of the arrows; and FIG. 5 is a schematic diagram of the circuitry included in the temperature sensor.

DETAILED DESCRIPTION OF THE INVENTION

Referring now to the drawings in more detail, a temperature sensor constructed in accordance with the present invention is generally designated by numeral 10. The temperature sensor 10 includes a generally flat mounting plate 12 which is constructed to be mounted flush on the surface of a wall such as the wall 14 shown in broken lines in FIG. 4. Plate 12 may conveniently formed from rigid plastic, although metals and other materials may also be used. The outer surface of plate 12 faces into an occupied space such as an office or other room located within a building and heated and cooled by an air conditioning system. The air conditioning equipment operates under the control of the temperature sensor 10. The outer surface of the plate 12 is beveled at 12a on its periphery. The back surface of plate 12 is located adjacent to the wall 14 and is provided on its periphery with a flat lip 12b which directly contacts the surface of wall 14. A pair of wall fasteners 16 (see FIG. 4) are extended through holes 18 formed in plate 12 and are threaded into or otherwise fastened to the wall 14 in order to mount plate 12 substantially flush with the exposed surface of the wall.

A rectangular cavity 20 is formed in the outer surface of plate 12. The cavity 20 is approximately 1.1 inches wide, 1.6 inches long, and ¼ inch deep in one embodiment of the invention. The bottom of cavity 20 is formed by a flat base panel 22 which is integral with plate 12.

Mounted in cavity 20 are a styrofoam block 24 and an aluminum sensor plate 26. The block 24 serves as a thermal insulator for the sensor plate 26 and may be approximately 0.9 inch wide, 1.4 inches long and 3/16 inches thick. Both of the flat surfaces of block 24 are provided with a suitable adhesive, and the back side of the block is adhesively secured to the base panel 22. Block 24 is somewhat smaller than cavity 20 so that an air space is provided between the edges of the block and the walls of the cavity 20, as best shown in FIG. 4. A passage 24a is formed through the center of block 24 and registers with a larger opening 22a which is formed through the base panel 22. By way of example, passage 24a can have a diameter of ¼ inch, while the diameter of opening 22a may be ⅜ inch.

The length and width dimensions of the aluminum sensor plate 26 are slightly less than those of the cavity 20 and slightly greater than those of block 24. For example, plate 26 may have a width of one inch, a length of 1.5 inches and a thickness of approximately 0.03 inch. The front or exposed face of plate 26 is roughened or provided with a backed enamel coating and is coplanar with the exposed surface of plate 12. The back face of plate 26 is bare aluminum and is adhesively secured to the insulating block 24. Because of the difference between the dimensions of cavity 20 and plate 26, a small gap of approximately 0.05 inch is provided between each edge of plate 26 and the corresponding wall of the cavity 20. The manner in which the sensor plate 26 is mounted maintains it thermally isolated from the mounting plate 12.

A rectangular pocket 28 is formed on the back surface of plate 12. The pocket 28 includes opposite side walls 28a, a top wall 28b and a bottom wall 28c, all of which are integral with plate 12. The pocket 28 is considerably larger and deeper than the cavity 28 on the front side of plate 12. The base panel 22 forms the bottom of the pocket 28. Extending along the base panel 22 adjacent to the opposite side walls 28a of the pocket are a pair of ribs 30 (one of which is shown in FIG. 1). The ribs 30 cooperate with upper and lower tabs 32 to form a mounting surface for receiving the edges of a rectangular printed circuit board 34. The front side of the circuit board 34 engages ribs 30 and tabs 32 and faces toward and is spaced from the base panel 22. Screws 36 are extended through the circuit board and threaded into the tabs 32 in order to hold the circuit board in place within the pocket 28. The circuit board has substantially the same width and length as pocket 28 in order to fit closely therein, as best shown in FIG. 4.

The active circuit components of the temperature sensor are mounted on the back side of circuit board 34 or the side which faces into the wall cavity. The pocket 28 is located within the wall cavity when plate 12 is mounted on the wall.

An electronic temperature transducer is formed by an integrated circuit 38 which provides an output current proportional to the temperature sensed by the transducer. The temperature sensing circuit 38 may be of the type commercially available under the trade designation AD590, and its components and manner of operation are described in U.S. Pat. No. 4,123,698 which is herein incorporated by reference.

The temperature sensing circuit 38 is enclosed within a metal housing which is secured to the back face of plate 26 by a drop of heat conductive adhesive 40 (see FIG. 4). The housing for the integrated circuit 38 is thus in thermal contact with plate 26 and is located within the passage 24a in the styrofoam insulated block 24. Circuit 38 includes a pair of electrical leads 42 which extend through passage 24a and opening 22a to the circuit board 34. The leads 42 are connected with the remainder of the circuit by soldering them to pads 42a located on the back side of the circuit board 34.

A cover plate 44 may be attached by screws 46 to the back edge of the pocket 28 if it is desired to enclose the circuitry within the pocket. However, in most cases, it is more desirable to leave the back of the pocket open so that the heat generated by the active circuit components on the back side of the circuit board can be dissipated into the wall cavity by radiation and convection. Consequently, the cover plate 44 is normally used only during handling and shipping and is removed when the unit is installed.

Referring now to FIG. 5, the electronic circuitry associated with the temperature sensing circuit 38 includes a diode 48 having its anode connected with a terminal 50 to which an unregulated positive DC voltage in the range of +6 to +9 volts DC is applied. The diode 48 protects the remainder of the circuit from damage in the event that the wiring is improperly connected. Also, an ammeter 52 can be connected across the diode 48 to provide a current measurement. The measured current in milliamps multiplied by 30 yields a measurement of the temperature in °F. Thus, the diode provides a convenient local means for measuring the temperature.

A filtering capacitor 53 is connected between the cathode of diode 48 and an internal common ground line of the circuit. The capacitor 53 filters out high frequency noise. The cathode of the diode 48 is also connected with an operational amplifier 54 and with one side of the temperature sensing circuit 38. The temperature sensing circuit is precalibrated to provide an output current of one microamp per degree centigrade, and the output side of circuit 38 is connected with the positive input to the operational amplifier 54.

Another operational amplifier 56 is included with amplifier 54 in a single integrated circuit package 58 (see FIGS. 1 and 4) mounted on the back side of the printed circuit board 34. The two amplifiers 54 and 56 are powered by the DC voltage that is available at the cathode of diode 48. The operational amplifiers have excellent temperature and voltage stability (50–100 ppm) over the temperature and voltage range to which they are normally subjected.

Amplifier 56 serves as a reference voltage source. The internal regulated voltage of 200 millivolts is applied to the positive input of amplifier 56. The output of amplifier 56 connects to its negative input through resistor 60 and filtering capacitor 62 in parallel. Resistor 64 connects the negative input to amplifier 56 with the common internal ground line of the circuit.

The reference voltage which is thereby obtained from amplifier 56 (approximately 499 millivolts) is more stable than that which could be obtained from a Zener diode of comparable cost. The current and power consumption are also low in comparison to those of a more conventional integrated circuit acting as a separate voltage reference source.

The stable reference voltage on the output of amplifier 56 is applied to a pair of series resistors 66 and 68, and to a calibration potentiometer 70 connected between the resistors 66 and 68. Resistor 68 is connected with the common ground line for the circuit. The center tap 72 of the potentiometer 70 connects with the negative input of operational amplifier 54. Potentiometer 70 preferably has an adjustment range of approximately 20° F. By properly adjusting the potentiometer, a calibrated reference voltage is applied to the negative input of amplifier 54. A filtering capacitor 74 is connected between the output and the negative input of operational amplifier 54 to filter high frequency noise.

The variable output of amplifier 54 connects through resistor 76 with the common ground line of the circuit. The output then combines with other substantially constant currents and flows from the system common line through resistor 78 to the negative terminal 80 of the circuit. The negative terminal 80 connects with the positive input of amplifier 54 through resistor 82 and filtering capacitor 84 which are in parallel with one another and in series with resistor.

A remotely located panel 86 connects with the negative terminal 80 through suitable wiring 88 which leads to one end of a 300 ohm, 1% precision resistor 90. The other end of resistor 90 connects with actual ground. A read out display 92 on panel 86 is connected across the resistor 90 and measures the voltage across the resistor. The voltage measurement in volts can be multiplied by 100 to provide an indication of the actual room temperature in °F. The temperature may be displayed on the read out device 92, and it may also be used as a thermostat signal to control air conditioning equipment and other machinery if desired.

The temperature sensor 10 is assembled by first securing the styrofoam insulating block 24 to the base panel 22 and then securing the aluminum sensor plate 26 to the insulating block 24. For good thermal isolation of the sensor plate 26, it is necessary that the edges of the plate remain out of contact with the mounting plate 12. The integrated circuit 40 normally has three leads 42, one of which is normally used to facilitate mounting of the device. This third leg is preferably trimmed off to prevent it from conducting heat to the circuit 38. The other two leads 42 are extended through the circuit board 34 to its back side and are hand soldered to the pads 42a while the housing for the integrated circuit 38 is held by a jig (not shown) a preselected distance away from the front surface of the circuit board 34. This properly locates the circuit 38 relative to the circuit board. The circuit 38 should be spaced at least ¼ inch away from the circuit board 34.

At this point, all of the circuit components have been soldered or otherwise installed on the back side of the circuit board 34. A drop of heat conducting glue 40 is applied to the back face of plate 26 through opening 22a and passage 24a, and the circuit board 34 is then applied to the ribs 30 and mounting tabs 32 with the integrated circuit 38 disposed against the back face of plate 26 and against the glue 40. The screws 36 can then be applied to secure the circuit board 34 in place within the pocket 28. The back cover 44 can be applied to protect the circuit components from damage during shipping and handling. As previously indicated, the cover 44 is removed before the device is installed. The potentiometer 70 is adjusted in the factory in order to properly calibrate the device.

Installation on the wall 14 is quickly and easily carried out by first cutting a rectangular hole 14a in the wall at the proper location and the same size as or slightly larger than the pocket 28. Plate 12 can be applied flush to the surface of wall 14 and mounted on the wall by applying the screws 16. The remote panel 86 can be situated at any desired location and connected to terminal 80 the wiring 88. The installed unit has an aesthetically pleasing and architecturally desirable appearance with only the outer surface of the mounting plate 12 and the sensor plate 26 visible. The flush mounting of the unit is an architecturally desirable feature, and the sensor is no more objectionable than an ordinary flush mounted wall switch or outlet cover plate.

In operation of the sensor, naturally occurring convection carries the air within the occupied space into direct thermal contact with the exposed face of the sensor plate 26. The sensor plate 26 is thereby maintained at the same temperature as the air within the occupied space, and this temperature is transmitted by conduction to the temperature sensing circuit 38. Circuit 38 acts as a current source which provides a current that is directly proportional to the sensed temperature. If the current through the sensing circuit 38 increases, the current through resistor 82 also increases, and the voltage on the positive input to the operational amplifier 54 increases as a result. Because of the high gain of the operational amplifier 54, this increase in the positive input increases the output voltage and thus increases the current through resistors 76 and 78, making the output terminal 80 more negative. The negative incremental voltage at terminal 80, working back through resistor 82, drains off the incremental current from circuit 38 and pulls the voltage on the positive input to the operational amplifier back down to where it is approximately equal to the reference voltage applied to the negative input of amplifier 54. In this manner, the output voltage of the operational amplifier changes as necessary to effect substantial equality in the inputs to amplifier 54.

The current gain is established by the current divider network comprising resistors 82 and 78. With resistor 82 having a resistance of 1.8 kohms and resistor 78 having a resistance of 30.1 ohms, the current gain is given by 1+1800/30.1=60. The current gain thus converts the one microamp/°C. output from the low power temperature sensing circuit 38 to 33 microamps/°F. appearing at terminal 80. The current gain makes the device less sensitive to noise by making it possible to provide at the remote panel 86 a relatively large voltage (typically 0.75 volts compared to the 0.025 ambient thermal voltage). Also, the terminal resistor 90 has a nearly optimal terminal resistance (300 ohms compared to the 377 ohm characteristic resistance of free space). The zero output point is shifted from absolute zero to 0° F., thereby reducing the typical offset and improving the overall accuracy by reducing the problem of resolving a small difference in a large number. It also permits factory calibration at the temperature of greatest interest (approximately 34° or 75° F.). The voltage across the terminal resistor 90, when multiplied by 100, provides a measurement of the air temperature in the occupied space.

The improved electrical capabilities of the circuit are obtained at the cost of a substantial increase in the heat generated during operation of the device. The heat should be minimized by keeping the applied voltage as low as possible, and the applied voltage should thus be maintained at a maximum of 8 volts DC. Self heating can also be minimized by minimizing the current. However, due to the nature of the circuit and the active components, it is not practical to reduce the current below the values indicated previously without reducing the current to the low power temperature sensing circuit 38, which would result in a loss in the advantages of noise immunity, offset compensation, and factory calibration for improved accuracy and field interchangeability.

Because of the current gain, the temperature sensing circuit 38 generates only 1/60 of the power of the rest of the circuitry, and the considerable heat which is generated by the remainder of the circuitry is transmitted by conduction to the wall 14. The key generating components are all located on the back side of the circuit board 34, and the heat is conducted from the components to the fiberglass circuit board 34 and then from the circuit board to the mounting plate 12 and the wall 14. At the same time, the temperature sensor 38 and sensor plate 26 are thermally isolated from the wall due to their physical separation from the wall and the insulation provided by the styrofoam block 24. The air gap which is provided between the housing for circuit 38 and the circuit board 34 provides effective thermal insulation, with only a small amount of heat being transmitted through the electrical leads 42. The heat generated by the active circuit components on the back side of circuit board 34 is also dissipated by radiation and convection through the back of the pocket 28 and into the wall cavity.

It is preferred that the sensor plate 26 be constructed of aluminum because of its good thermal properties. Also, the ratio of the area of the sensor plate to its thickness should be approximately as indicated above for thermal reasons as well as structural and economic reasons. Plate 26 should not only conduct heat but it should do so with a minimum possible time delay in order to avoid delays in the response time. By increasing the thickness of the plate to improve its thermal conductivity, the thermal performance is actually degraded because of the added thermal capacity which slows down the response time and thereby tends to destabilize the HVAC control system.

The exposed parts of the temperature sensor 10 can be painted or otherwise attractively finished in order to match the color and decor of the room in which it is installed. Most paints improve the thermal contact with the air in the occupied space by improving the thermal emissivity to thereby improve the radiative transfer to the sensor plate from all of the surfaces and bodies in the room. If the paint is relatively thin (less than 0.003 inch thick), the radiative transfer improves faster than the thermal conductivity is degraded or the thermal capacity is increased. However, it is important to assure that the paint does not for a conductive bridge between the edge of the aluminum sensor plate 26 and the walls of the cavity 20. For this reason, the dimensions of the styrofoam block 24 are preferably somewhat less than those of the sensor plate 26 so that a large gap is provided behind the plate between the styrofoam block and the cavity walls. It is difficult for paint and other finishing materials to fill such a broad gap.

From the foregoing, it will be seen that this invention is on well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A wall mounted temperature sensor for sensing the air temperature in a building, said sensor comprising:
   a generally flat mounting plate adapted to be mounted on the wall in thermal contact therewith to transfer heat to the wall from said mounting plate;
   a thermally conductive plate having opposed first and second faces;
   means for connecting said sensor plate with said mounting plate in close physical proximity thereto and in a manner to thermally isolate the mounting and sensor plates from one another with said first face of the sensor plate exposed to the air in the building;
   an electronic temperature transducer operating at a low power level and generating an output signal representative of the temperature sensed by said transducer, said transducer having electrical leads;
   a circuit board having opposite first and second sides and a peripheral edge portion;
   an electronic circuit for conditioning said output signal, said circuit including a plurality of heat generating components mounted on said first side of the circuit board;
   means for mounting said circuit board on said mounting plate with said peripheral edge portion of the circuit board in contact with said mounting plate and with the board recessed in the wall and said second side facing the mounting plate; and
   means for coupling said leads of the transducer with said circuit on said first side of the circuit board with said transducer spaced away from said second side of the board at a location in contact with said second face of the sensor plate, whereby the temperature of the sensor plate is sensed by said transducer and heat generated by said heat generating components is dissipated into the wall by convection and radiation and by conduction from the circuit board to the mounting plate.

2. The invention of claim 1, including thermally conductive adhesive securing said transducer to said second face of the sensor plate.

3. The invention of claim 1, including a cavity in said mounting plate, said connecting means locating said sensor plate in said cavity with a gap presented between the periphery of said sensor plate and walls of the cavity.

4. The invention of claim 3, including:
a base panel on said mounting plate forming the bottom of said cavity; and
a block of thermal insulation interposed between said sensor plate and base panel.

5. The invention of claim 4, including aligned openings in said base panel and block for receiving said electrical leads, said transducer being located in said opening in said block.

6. The invention of claim 1, including a pocket in said mounting plate located to be recessed in the wall when said mounting plate is mounted thereon, said circuit board being mounted in said pocket.

7. The invention of claim 1, wherein said output signal is an output current from the transducer applied on an output side thereof and proportional to the sensed temperature, said circuit comprising:
an operational amplifier having positive and negative inputs and an output, said positive input being connected with said output side of the transducer;
a stable voltage source applying a calibrated reference voltage to the negative input of said operational amplifier;
a current divider including a plurality of resistors connected in series between said output of the operational amplifier and the positive input thereof, said current divider including a pair of resistors connected at a junction and providing at said junction a gain current proportional to the temperature sensed by the sensor and representing a gained said output current determined by the ratio of the resistances of the resistors in said pair; and
an output terminal connected to said junction and carrying said gain current to provide a measure of the temperature.

8. A wall mounted temperature sensor for installation on a building wall, said sensor comprising:
a generally flat mounting plate adapted to be mounted on the wall in direct thermal contact therewith to transfer heat from the mounting plate to the wall, said plate having a first surface facing into the building and a second surface facing the wall;
a cavity in said first surface;
a thermally conductive sensor plate mounted in said cavity out of physical contact with said mounting plate and thermally isolated therefrom, said sensor plate having a first face exposed to the air in the building and a second face which faces the wall;
a circuit board having opposite first and second sides and a peripheral edge portion;
an electronic temperature transducer operating at a low power level and generating an output signal representative of the temperature sensed by said transducer, said transducer having a pair of electrical leads extending to the first side of said board and said transducer being spaced away from said second side of the board;
an electronic circuit for conditioning said output signal, said circuit including a plurality of heat generating components mounted on said first side of the circuit board and connected with said leads;
a pocket on said second surface of the mounting plate for receiving said circuit board, said pocket being located within the wall when said mounting plate is mounted thereon to dissipate heat from said heat generating components to the wall by convection and radiation;
means for securing said circuit board in said pocket with said peripheral edge portion of the circuit board in contact with said mounting plate and at a location wherein said first face of the board faces away from the mounting plate to thermally isolate said heat generating components from said transducer and sensor plate; and
means for maintaining said transducer adjacent said second face of the sensor plate, whereby said transducer senses the sensor plate temperature and a path is established for dissipating heat from the heat generating components to the circuit board to the mounting plate and to the wall by conduction.

9. The invention of claim 8, including a block of thermal insulation between said mounting plate and said second face of the sensor plate.

10. The invention of claim 8, including:
a base panel on said mounting plate separating said cavity from said pocket; and
a block of thermal insulation in said cavity between said base panel and said sensor plate.

11. The invention of claim 10, including aligned openings in said base panel and block which receive said electrical leads, said transducer being located in said opening in the block.

12. The invention of claim 8, wherein said first surface of the mounting plate and said first face of the sensor plate are substantially coplanar.

13. The invention of claim 8, wherein:
an operational amplifier having positive and negative inputs and an output, said positive input being connected with said output side of the transducer;
a stable voltage source applying a calibrated reference voltage to the negative input of said operational amplifier;
a current divider including a plurality of resistors connected in series between said output of the operational amplifier and the positive input thereof, said current divider including a pair of resistors connected at a junction and providing said junction a gain current proportional to the temperature sensed by the sensor and representing a gain of said output current determined by the ratio of the resistances of the resistors in said pair; and
an output terminal connected to said junction and carrying said gain current to provide a measure of the temperature.

14. A wall mounted temperature sensor for sensing the air temperature in a building, said sensor comprising:
a generally flat mounting plate adapted to be mounted on the wall in intimate thermal contact therewith, said mounting plate having a first surface facing into the building and a second surface facing the wall;

a cavity in said first surface, said cavity having a base panel comprising part of said mounting plate;

a thermal insulating block secured in said cavity of said base panel, said block having a passage therethrough;

a thermally conductive sensor plate secured to said block and having a first face arranged substantially coplanar with said first surface of the mounting plate and facing into the building for exposure to the air therein, said sensor plate having a second face adjacent said block and a peripheral edge spaced from said mounting plate;

a pocket on said second surface of the mounting plate, said pocket being located in the wall when said mounting plate is mounted therein;

an electronic temperature transducer located in said passage of the insulating block and contacting said second face of the sensor plate, said transducer operating to generate an output signal representation of the temperature sensed thereby and having no more than two electrical leads for transmitting said output signal, said leads extending through said base panel and into said passage in the insulating block;

a circuit board mounted in said pocket and having opposite first and second sides respectively facing away from and toward said sensor plate, said circuit board being spaced away from said base panel and having a peripheral edge portion in contact with said mounting plate; and an electronic circuit for conditioning said output signal, said circuit including a plurality of heat generating components mounted on said first side of the circuit board with said electrical leads extending through said base panel and being connected with said circuit on said first side of the circuit board, whereby heat generated by said components is dissipated to the wall by convection and radiation and by conduction through the circuit board and mounting plate.

15. A temperature sensing circuit comprising:

a electronic temperature sensor operable to sense temperature and providing on an output side thereof an output current proportional to the sensed temperature;

an operational amplifier having positive and negative inputs and an output, said positive input being connected with said output side of the sensor;

a stable voltage source applying a calibrated reference voltage to the negative input of said operational amplifier;

a current divider including a plurality of resistors connected in series between said output of the operational amplifier and the positive input thereof, said current divider including a pair of resistors connected at a junction and providing at said junction a gain current proportional to the temperature sensed by the sensor and representing a gain of said output current determined by the ratio of the resistances of the resistors in said pair; and an output terminal connected to said junction and carrying said gain current to provide a measure of the temperature.

16. The invention of claim 15, wherein said voltage source comprises:

a second operational amplifier having positive and negative inputs and an output and an internal voltage applied to said positive input;

a resistive feedback from the output to the negative input of said second operational amplifier; and a resistor connected between said negative input and internal ground, whereby a stable reference voltage is applied to the output of said second operational amplifier.

17. The invention of claim 16, including a potentiometer having an adjustable center top, said potentiometer being connected between said output of the second operational amplifier and internal ground and said center top connected to the negative input of the first mentioned operational amplifier, whereby adjustment of said center top effects adjustment of the reference voltage applied to said negative input for calibration of the reference voltage.

* * * * *